United States Patent [19]
Sugahara

[11] 3,811,691
[45] May 21, 1974

[54] PISTON RING HAVING PERIPHERAL GROOVE

[75] Inventor: Eisuke Sugahara, Tokyo, Japan

[73] Assignee: Nippon Piston Ring Co., Ltd., Tokyo, Japan

[22] Filed: Sept. 3, 1971

[21] Appl. No.: 177,763

[52] U.S. Cl. ............................................. 277/224
[51] Int. Cl. .............................................. F16j 9/20
[58] Field of Search .......... 277/231, 223, 224, 216, 277/217, 214, 215, 206.1

[56] References Cited
UNITED STATES PATENTS
| | | | |
|---|---|---|---|
| 1,721,325 | 7/1929 | Wilson | 277/206 X |
| 2,330,635 | 9/1943 | Siebel | 277/223 |
| 455,601 | 12/1950 | Avskodawerke | 277/223 |
| 740,323 | 5/1943 | Siebel | 277/223 |

Primary Examiner—Louis R. Prince
Assistant Examiner—Robert I. Smith
Attorney, Agent, or Firm—Sughrue, Rothwell, Mion, Zinn & Macpeak

[57] ABSTRACT

A piston ring having a peripheral groove formed in its outer sliding surface for accommodating a ferrosoferric oxide to improve the wear-resistivity of the piston ring is modified by removing a segment of material from the piston ring. This segment of material, or balance cut, is provided at the inner peripheral side of the piston ring for balancing the stress forces on the piston ring and thereby reducing the tensile stress on the outside periphery of the piston ring.

1 Claim, 9 Drawing Figures

PISTON RING HAVING PERIPHERAL GROOVE

BACKGROUND OF THE INVENTION

1. Field of the Invention

The present invention relates to an improvement in a piston ring made of cast iron having a groove provided along its outer sliding surface for retaining ferrosoferric oxide or the like in the groove for obtaining an improved wear-resistivity of the piston ring. More particularly, the invention is directed to balancing the stresses in a piston ring of this type.

2. Description of the Prior Art

A serious problem has existed in the field of piston rings, namely, the propensity for piston rings to break. Generally, piston rings must be designed so that the maximum stresses at the inner and outer peripheries of the piston ring will be well under an allowable stress value of, for instance, 35 Kg/mm².

Recent innovations in the art of piston rings have included grooves provided along the sliding surface of the piston ring for obtaining an improved wear-resistivity. Generally, when the groove is provided in the piston ring, the neutral stress axis of the piston ring will have a tendency to be shifted inward, with a corresponding increase in the tensile stress adjacent the outside periphery.

In a conventional piston ring having a groove for accommodating ferrosoferric oxide or the like for improving the wear-resistivity, the shifting of the neutral stress axis has not been recognized, and hence, the development of maximum tensile stress at the outer periphery of the piston ring has often been permitted to exceed the above-described allowable value, thereby causing the piston ring to be broken in operation.

SUMMARY OF THE INVENTION

The primary object of the present invention is to provide an improved construction of a grooved piston ring, wherein an excessive displacement of the neutral stress axis is prevented, and accordingly, the possibility of breaking the piston ring is eliminated. This object is accomplished in a simple and economical manner, by an appropriate designing of the stress characteristics of the piston ring. Another object of the present invention is to provide an improved construction of a piston ring, wherein the simple procedure for compensating the tendency of the neutral stress axis from being shifted because of the existence of the groove will also positively assist the circulation of lubricating oil through the rear side of the piston ring.

The purposes of the present invention can be achieved by an improved construction of the piston ring having a groove for accommodating a wear-resistant material, such as ferrosoferric oxide, on its outer sliding surface, by providing a balance cut in the inner periphery of the piston ring, which permits the relocation of the neutral stress axis that was shifted initially because of the existence of the groove.

BRIEF DESCRIPTION OF THE DRAWINGS

The nature, principle, and utility of the present invention will be better understood from the following detailed description of the invention, when read in conjunction with the accompanying drawings, in which.

DESCRIPTION OF THE PREFERRED EMBODIMENT

Assuming that the tensile stress appearing in the outer peripheral portion of the piston ring is $\sigma_t$, and the compressive stress caused in the inner peripheral portion thereof is $\sigma_c$, these stresses $\sigma_t$ and $\sigma_c$ are generally calculated by the following formulae:

$$\sigma_t = 2El(1-\alpha)\ t/3\pi[1+(1-\alpha)\ t] \qquad (1)$$
$$\sigma_c = 2El\alpha t'/3\pi\pi\ 1-\alpha t) \qquad (2)$$

wherein, $t = T/R$, $l = L/R$, $\alpha = Y/T$; and
R: a nominal radius of the piston ring,
L: free gap,
T: thickness of the ring,
E: the modulus of elasticity,
Y: a distance between the neutral plane P and a sectional plane the stress in which plane is to be determined.

Figure 3A:
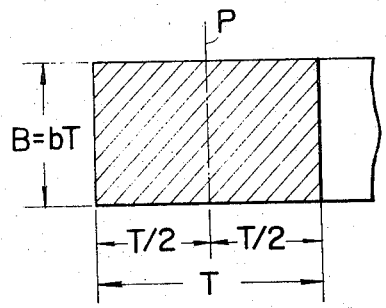
FIG. 3(a) is a cross-sectional view of an ordinary piston ring made of cast iron, which is employed for theoretical discussion of the present invention.
Figure 3B:
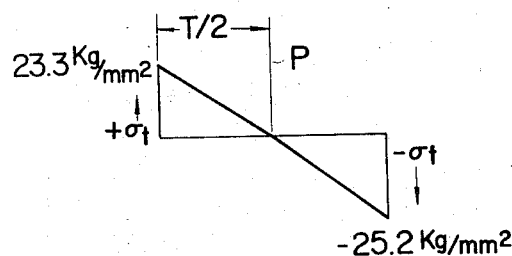
FIG. 3(b) is a diagrammatic representation of the internal stress distribution between the outer and inner peripheries of the ordinary piston ring shown in FIG. 3(a)

Generally speaking, the neutral stress plane (or neutral stress axis) P of a piston ring, which is generated when internal stresses of the ring are calculated, is assumed to be at the middle point of the thickness T as shown in FIG. 3(a), and for this reason, $\alpha$ in the formulae (1) and (2) is expressed as $\alpha = 0.5$. Common figures generated for a conventional art piston ring as indicated in FIG. 3(b) have been $\sigma_t = 23.3$ Kg/mm² and $\sigma_c = 25.2$ Kg/mm².

However, in an actual piston ring made of cast iron, the modulus of elasticity for tension $E_t$ is different from that for compression $E_c$ ($E_t < E_c$), and for this reason, the neutral stress plane P is slightly shifted towards the inner periphery of the piston ring. The distance of the neutral stress plane P from the inner periphery of the actual piston ring, which is denoted by $h_1$, can be expressed as $$h_1 = \sqrt{E_t}/(\sqrt{E_t} + \sqrt{E_c}) \times T \qquad (3)$$

Figure 4A:
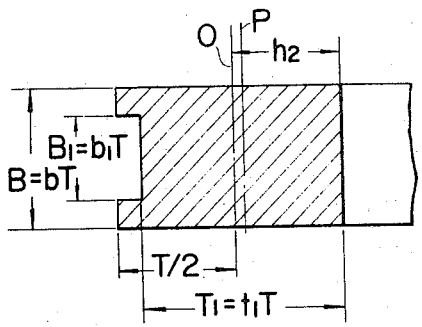
FIG. 4(a) is a cross-sectional view of a conventional form of piston ring having an outside peripheral groove, which is also employed for theoretical discussion of the present invention.
Figure 4B:
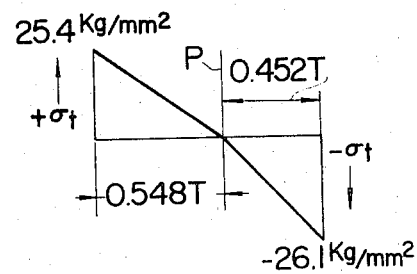
FIG. 4(b) is a diagrammatic representation of the internal stress distribution between the outer periphery and inner periphery of the piston ring shown in FIG. 4(a)

Now considering a piston ring having a peripheral groove 1 as shown in FIG. 4, the neutral stress plane P at this time is shifted inward as shown in FIG. 4(a). Assuming that the distance from the inner periphery to the center of the sectional area O is $h_2$, it is apparent from a basic theory of strength of materials that the distance $h_2$ can be expressed in the following formula (4), and the stress distribution in the sectional area of the piston ring is indicated as shown in FIG. 4(b).

$$h = T/2 \cdot [b - (1 - t_1^2)b_1]/b - (1 - t_1) b_1 \qquad (4)$$

Herein, $b = B/T$ and $b_1 = B_1/T$, and B is the width of the piston ring, T is the thickness of the piston ring, and $B_1$ is the width of the peripheral groove 1.

From the formulae (3) and (4), it will be apparent that the neutral stress plane P is shifted to a position inward from the center O of the cross-sectional area, and as a result, an excessive tensile stress tends to appear at the outer periphery of the piston ring. If this tensile stress exceeds the allowable stress for this piston ring of, for instance, 35 Kg/mm², the ring will be broken. The present invention is directed to eliminate this possibilty as described above by providing a balance cut for returning the neutral stress plane which was shifted inwardly because of the provision of the peripheral groove for accommodating ferrosoferric oxide or the like in the groove.

Figure 1A:
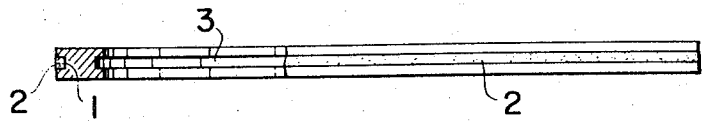
FIG. 1(a) is a cross-sectional profile view, partly in section, of a piston ring constituting an embodiment of the present invention.
Figure 1B:
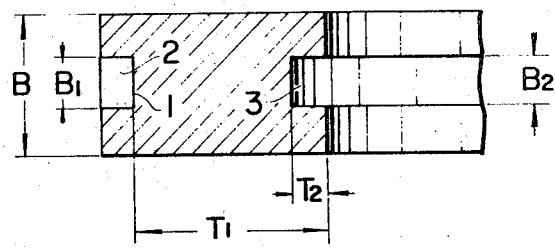
FIG. 1(b) is an enlarged view of the cross-sectional area disclosed in FIG. 1(a)
Figure 2A:
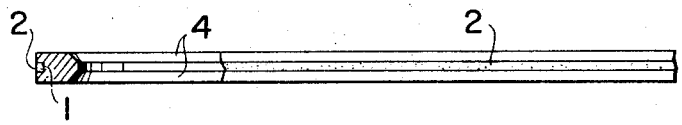
FIG. 2(a) is a cross-sectional profile view, partly in section, of a modification of the present invention.
Figure 2B:
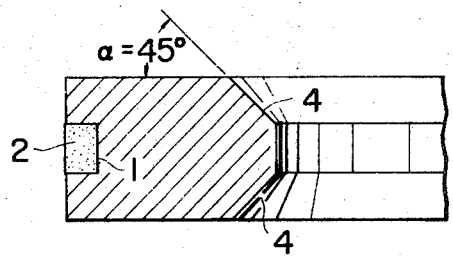
FIG. 2(b) is an enlarged view of the cross-sectional part of FIG. 2(a)

The balance cut may be provided in the form of a recess 3 running along the inner peripheral surface of the ring as shown in FIG. 1, or in the form of tapered surfaces 4,4 located at the upper and lower corners of the inner peripheral surface as shown in FIG. 2. The important thing is that the balance cut is so provided that the neutral stress plane shifted toward the inner periphery of the ring is thereby returned to its original position located substantially at T/2 of the thickness of the piston ring.

Considering an example of the present invention the measurements thereof as shown in FIG. 4(a) being selected as $b = 0.7$, $t_1 = 0.8$, and $b_1 = 0.25$, and in that case, the movement of the center O of the sectional area of the piston ring toward the inner periphery is calculated to be 0.031T, and the movement of the neutral stress plane P from the center O inwardly is calculated to be 0.017T, when the modulus of elasticity $E_t$ and $E_c$ are assumed to be $E_t = 9,500$ Kg/mm² and $E_c = 10,900$ Kg/mm².

The neutral stress plane P is thus shifted from its original position inwardly by a distance equalling the sum of the above described distances $0.031T + 0.017T = 0.048T$. If no balancing or cancelling the displacement of the neutral stress plane P is provided for in the design, the distribution of the inner stresses will be as shown in FIG. 4(b), and an excessive accumulation of tensile stresses will occur at the outer peripheral portion of the piston ring as shown in the same drawing.

Figure 5:
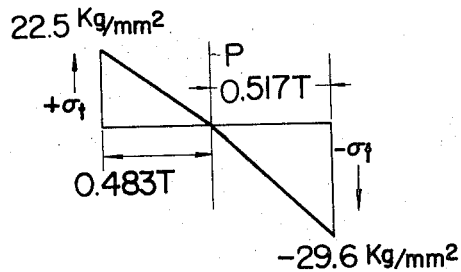
FIG. 5 is a diagrammatic representation of an internal stress distribution between the outer periphery and inner periphery of a piston ring embodying the present invention.

In accordance with the present invention, a balance cut 3 or 4 can be provided along the inner periphery of the piston ring as shown in FIGS. 1 and 2 so that the neutral stress plane P is returned to its original position. As a result, the stress distribution in the sectional plane of the piston ring will be improved as shown in FIG. 5, which has a tensile stress at the outer peripheral surface, which is apart from the neutral stress plane P by 0.483T, equal to $\sigma_t = 22.5$ Kg/mm² and a compressive stress at the inner peripheral surface, which is apart from the neutral stress plane P by 0.517T, equal to $\sigma_c = 29.6$ Kg/mm². The reason that the neutral stress plane P is shifted slightly to the outer periphery is that the tensile stress will thereby be smaller than the compressive stress, and any possibility of breaking the piston ring will thereby be substantially eliminated.

In the example of FIG. 1, if $b_2 = B_2/T$ is selected to be 0.3, $t_2 = T_2/T$ is thereby 0.27, and the size of the balance cut 3 can be easily determined. Likewise, in the example of FIG. 2, the size of the tapered surfaces 4,4 can be determined accordingly with the tapered angle $\alpha$ in this case being selected to be 45°.

Although the balance cuts 3 and 4 according to the present invention appear simple in construction and economical, in production, they substantially eliminate any breaking fault of the piston ring, and their contribution to the industry is conspicuous.

What is claimed is:

1. In a piston ring having a rectangular peripheral groove in the center of its outer sliding surface for holding a wear resistant material, having an inner surface on the piston ring contoured to provide a stress balancing of the stress effects of the outer peripheral groove by having a portion of the ring material removed so that the tensile stress on the outside sliding surface will be equal to or less than a similar cross-sectional ring without a peripheral groove, wherein the inner surface contour comprises a central peripheral groove of identical cross-section configuration and size to the outside peripheral groove.

* * * * *